US008407374B2

(12) United States Patent
Ross et al.

(10) Patent No.: US 8,407,374 B2
(45) Date of Patent: Mar. 26, 2013

(54) INTELLIGENT RESOURCE STATE MEMORY RECALL

(75) Inventors: David Allan Ross, Nepean (CA); Leslie Vincent O'Reilly, Ottawa (CA); Troy David English, Ottawa (CA); Alun John Fryer, Richmond (CA); Steven Martin Robinson, Kars (CA); Gerald Edwin Coldwell, Ottawa (CA); Jean-Francois Gagnon, Gatineau (CA)

(73) Assignee: Ross Video Limited, Nepean, Ontario (CA)

( * ) Notice: Subject to any disclaimer, the term of this patent is extended or adjusted under 35 U.S.C. 154(b) by 319 days.

(21) Appl. No.: 12/759,729

(22) Filed: Apr. 14, 2010

(65) Prior Publication Data
US 2010/0266264 A1    Oct. 21, 2010

Related U.S. Application Data

(60) Provisional application No. 61/170,317, filed on Apr. 17, 2009.

(51) Int. Cl.
G06F 3/00     (2006.01)
H04N 5/268    (2006.01)
H04N 5/222    (2006.01)
H04N 9/74     (2006.01)
H04N 9/75     (2006.01)
H03K 17/00    (2006.01)

(52) U.S. Cl. ............... 710/17; 710/8; 710/15; 348/706; 348/722; 348/585; 348/586; 348/587; 348/590; 348/591; 348/592; 340/2.28; 715/723; 715/724; 715/725; 715/726

(58) Field of Classification Search ............... 710/8, 15, 710/17; 348/706, 722, 585–587, 590–592; 340/2.28; 715/723–726
See application file for complete search history.

(56) References Cited

U.S. PATENT DOCUMENTS

| 4,205,344    | A   |   | 5/1980  | Rayner         |         |
|--------------|-----|---|---------|----------------|---------|
| 5,305,108    | A   | * | 4/1994  | Trytko         | 348/594 |
| 6,437,831    | B1  |   | 8/2002  | Windrem        |         |
| 6,588,018    | B1  | * | 7/2003  | James et al.   | 725/146 |
| 6,792,469    | B1  | * | 9/2004  | Callahan et al.| 709/231 |
| 7,631,284    | B1  | * | 12/2009 | Perry et al.   | 716/138 |
| 2003/0214605 | A1  | * | 11/2003 | Snyder et al.  | 348/578 |
| 2005/0219417 | A1  | * | 10/2005 | Ross et al.    | 348/584 |

* cited by examiner

Primary Examiner — Farley Abad
(74) Attorney, Agent, or Firm — Nixon Peabody LLP; Jeffrey L. Costellia

(57) ABSTRACT

Intelligent resource state memory recall techniques, and associated apparatus and methods, are disclosed. States of one or more video switcher resources in a resource state memory may be recalled to the same or different resources, depending on resource availability at the time of memory recall. A memory recall need not affect an on air signal. The memory may be recalled to recreate a desired program output, as defined in the memory, on a preview output of the video switcher, which leaves a current program output of the video switcher undisturbed when the memory is recalled.

35 Claims, 3 Drawing Sheets

INTELLIGENT RESOURCE STATE MEMORY RECALL

CROSS-REFERENCE TO RELATED APPLICATION

This application claims the benefit of U.S. Provisional Patent Application Ser. No. 61/170,317, entitled "INTELLIGENT RESOURCE STATE MEMORY RECALL", filed Apr. 17, 2009, the entire contents of which are incorporated herein by reference.

FIELD OF THE INVENTION

This invention relates generally to the video production industry and, in particular, to intelligent recall of resource state memories in a video switcher.

BACKGROUND

Operation of a video production switcher can be very complex, as there are often a large number of resources which are set to specific states to create a desired on-air effect. Thus, recreating an effect manually can be a time-consuming and error-prone task. Switchers often provide effects memories, as disclosed in U.S. Pat. No. 4,205,344, for example. An effects memory (or "memory" or "E-Mem" as it is also known), is a snapshot of the state of resources within an entire switcher or a defined subset of those resources, and may be considered a form of a video state or a "look" of a video output and/or audio output or "program".

Prior implementations of memories, as well as timelines and macros, are very useful tools to a user, allowing many complex video operations to be simplified into a small number of simple actions by the user. However, these tools tend not to be very flexible.

When a memory is recalled, it will completely replace the state of resources in the switcher or the subset of the switcher to which it has been recalled. This will remove any elements that were currently set up, either on-air or off-air, and replace them with those elements defined in the memory, affecting their on-air state. This is undesirable if a user wishes to recall a memory and then cleanly transition (using, for example, a dissolve, wipe or DVE effect) to the new settings. Current settings are instead instantaneously changed to the recalled settings.

Although a user may, in some switchers, set memory attributes to selectively recall desired subsets of a switcher or Multi-Level Effects device (MLE), the user must anticipate which resources are available at the time the memory, macro, or timeline is created. For example, if a user is currently using a chroma key on key 1, and wishes to recall another effect using a memory, the user must have previously built the effect into a memory on a keyer other than key 1, and set the appropriate memory attributes to recall the memory only to the previously-determined keyer. This is undesirable, for several reasons. First, it requires the user to anticipate which keyer may be available at recall time when the user is building and storing the memory. Secondly, it requires the user manually set attributes to control the specific subset of the switcher to recall. Thirdly, it does not allow for the user to preview the recalled memory before recalling it to air. Fourthly, some implementations map specific resources to fixed visual layers, wherein, for example, an element on key 2 always appears on top of an element on key 1. Selectively recalling using a memory attribute is limited in that the layering priority cannot be manipulated in the process of recalling the memory to a subset of the switcher, so the desired layering priority may not be achieved.

Some implementations allow effects stored in one MLE to be recalled to a different MLE, as disclosed in U.S. Pat. No. 6,437,831, for example. This can, in a limited fashion, allow a user to recall an effect which can be previewed on the switcher prior to bringing it on-air. However, this is limiting in that complete MLE banks must be recalled, and the user must pre-select which MLE will be used to recall the effect. Furthermore, this approach requires multiple MLE banks to perform this action. Since an MLE often employs multiple resources to create a complex effect, this approach is unsuitable when a smaller subset of resources is required, as the user must recall the inter-related resources to an MLE.

A further limitation of current video switcher technology is that small systems may have only 1 MLE and a memory recall will instantly replace all settings on the switcher. If the user wishes to perform a dynamic effect to transition from the previous state to the state defined within the memory, then they will be unable to do this. The method disclosed in U.S. Pat. No. 6,437,831 cannot be applied to a system having only 1 MLE.

Although "recall to preview" does, in some limited situations, allow a memory to be recalled to a subset of the switcher without disturbing the on-air output, it still requires the user to anticipate which resources will be available when the memory is recalled. Recall to preview will not recall the states of any resources that are on-air in the switcher state prior to the recall, so if the desired switcher memory uses, for example, key 1 when key 1 is already on-air, the state of key 1 will not be recalled. In this example, the user would have had to anticipate that key 1 would have been in use and stored the effect using a different keyer. Recall to preview also requires the user to anticipate how they wish to transition from the on-air state to the state recalled in the memory. The user must either program this into the memory or manually manipulate the transition controls on the control panel to cleanly transition to the newly recalled state.

SUMMARY

According to an aspect of the invention, an apparatus comprises: a data store for storing a resource state memory representing a state of a resource of a video switcher, the video switcher comprising a plurality of the resources; and a resource mapping module that determines availability of the resource when the resource state memory is to be recalled from the data store, and maps the state of the resource in the memory to another resource of the plurality of resources where the resource is unavailable and the other resource is available.

In some embodiments, the resource mapping module determines availability of the plurality of resources when the resource state memory is to be recalled from the data store.

In some embodiments, the resource mapping module determines that the resource is unavailable where the resource is in use or on air.

In some embodiments, the resource mapping module further determines a layering priority associated with the state of the resource in the memory, and sets a layering order of the other resource to match the layering order of the state of the resource in the memory where the state of the resource in the memory is mapped to the other resource.

In some embodiments, the plurality of resources comprises MLEs, keyers, wipe generators, crosspoints, or other types of video and/or audio processing elements.

In some embodiments, the video switcher comprises respective sets of different types of resources, the data store is for storing resource state memories each representing states of resources of one or more of the different types of resources, and the resource mapping module dynamically maps states of resources in the memories for each type of resource of a set comprising multiple resources.

In some embodiments, the apparatus further comprises: a memory recall module, operatively coupled to the data store and to the resource mapping module, that recalls the resource state memory such that the state of the resource in the memory is recalled to an available one of the plurality of resources, and the available one of the plurality of resources remains off air.

In some embodiments, the state of the resource in the memory is associated with a desired program output of the video switcher, and the memory recall module recalls the resource state memory to recreate the desired program output on a preview output of the video switcher, whereby a current program output of the video switcher is undisturbed when the resource state memory is recalled.

In some embodiments, the apparatus further comprises: a transition module, operatively coupled to the program output of the video switcher, that configures settings of the video switcher for a next transition in a manner that prepares the video switcher to transition the recalled resource state memory to the program output.

In some embodiments, the apparatus further comprises: a memory recall module, operatively coupled to the data store and to the resource mapping module, that recalls the resource state memory; and a macro recall module, operatively coupled to the resource mapping module and to the memory recall module, that recalls a macro. The resource mapping module or the memory recall module provides feedback to the macro recall module during execution of the macro to adapt execution of events in the macro, which are associated with the resource, to the other resource where the state of the resource in the memory is mapped to the other resource.

In some embodiments, the resource state memory comprises one of a plurality of resource state memories representing keyframes of a timeline, and the resource mapping module maps states in the memories to available resources of the video switcher for each keyframe.

In some embodiments, the apparatus further comprises: a memory recall module, operatively coupled to the data store and to the resource mapping module, that recalls the plurality of resource state memories; and a timeline recall module, operatively coupled to the resource mapping module and to the memory recall module, that recalls the timeline. The resource mapping module or the memory recall module provides feedback to the timeline recall module to adapt execution of events and recall of subsequent keyframes in the timeline, which are associated with particular resources, to the available resources.

In some embodiments, the apparatus further comprises: a user interface that enables a user to reserve one or more resources of the plurality of resources, the one or more reserved resources being unavailable for mapping by the resource mapping module, to lock the resource such that the state of the resource in the memory is recalled only to the resource, and/or to override mapping of the state of the resource in the memory by the resource mapping module.

In some embodiments, reservation of the one or more resources and/or locking of the resource are configurable globally, for application to specific subsets of the video switcher, and/or as a memory attribute specific to the resource state memory.

In some embodiments, the apparatus further comprises: an external interface that enables feedback regarding recall of the resource state memory to be provided to one or more of: a remote control system and an automation system.

In some embodiments, the apparatus further comprises: a user interface that enables feedback regarding recall of the resource state memory to be provided to a user, and the feedback comprises one or more of: an indication that the state of the resource in the memory is mapped to the other resource; an indication that the state of the resource could not be recalled; and an indication, prior to recall of the resource state memory, of the ability to recall the resource state memory.

In some embodiments, the apparatus further comprises: a logging module that provides information regarding mapping of the state in the memory to a resource or plurality of resources.

In some embodiments, the apparatus further comprises: a logging module that provides information regarding any or all of: mapping of the state in the memory to the resource, the one or more reserved resources, locking of the resource, and user override of mapping of the state of the resource in the memory by the resource mapping module.

In some embodiments, the video switcher is a video production switcher, a master control switcher, or a stand-alone keyer.

In some embodiments, the resource mapping module subdivides the resource state memory into a plurality of resource state memories for multiple resources.

A method is also provided, and comprises: storing a resource state memory representing a state of a resource of a video switcher, the video switcher comprising a plurality of the resources; determining availability of the resource when the resource state memory is to be recalled; and mapping the state of the resource in the memory to another resource of the plurality of resources where the resource is unavailable and the other resource is available.

In some embodiments, the method further comprises: determining availability of the plurality of resources when the resource state memory is to be recalled.

In some embodiments, the resource state memory comprises one of a plurality of resource state memories representing keyframes of a timeline, and mapping comprises mapping states in the memories to available resources of the video switcher for each keyframe.

In some embodiments, the method further comprises: providing feedback to adapt execution of events and recall of subsequent keyframes in the timeline, which are associated with particular resources, to the available resources.

In some embodiments, the method further comprises: providing a user interface that enables a user to reserve one or more resources of the plurality of resources, the one or more reserved resources being unavailable for mapping, to lock the resource such that the state of the resource in the memory is recalled only to the resource, and/or to override mapping of the state of the resource in the memory.

In some embodiments, the method further comprises: providing feedback regarding recall of the resource state memory to a user. The feedback may include one or more of: an indication that the state of the resource in the memory is mapped to the other resource; an indication that the state of the resource could not be recalled; and an indication, prior to recall of the resource state memory, of the ability to recall the resource state memory.

A method may be embodied, for example, in an article of manufacture in the form of a non-transitory computer-readable storage medium storing instructions which, when executed by a computer, cause the computer to perform the method.

An apparatus according to another aspect of the invention comprises: a data store for storing a resource state memory representing respective states of one or more resources of a video switcher to create a desired program output of the video switcher; and a memory recall module that recalls the resource state memory to the video switcher to recreate the desired program output on a preview output of the video switcher, whereby a current program output of the video switcher is undisturbed when the resource state memory is recalled.

In some embodiments, the video switcher comprises a transition control that enables a user to control an on air transition from the current program output to the desired program output.

In some embodiments, the transition control comprises one or more of: a button, a fader handle, an interface enabling remote GPI, and an interface enabling remote automation.

In some embodiments, the resource state memory comprises one of a plurality of resource state memories representing keyframes of a timeline, and the memory recall module recalls the memories to the video switcher for each keyframe.

The apparatus could also include a transition module, operatively coupled to the program output of the video switcher, that configures settings of the video switcher for a next transition in a manner that prepares the video switcher to transition the recalled resource state memory to the program output.

There is also provided a method comprising: storing a resource state memory representing respective states of one or more resources of a video switcher to create a desired program output of the video switcher; and recalling the resource state memory to the video switcher to recreate the desired program output on a preview output of the video switcher, whereby a current program output of the video switcher is undisturbed when the resource state memory is recalled.

The method might also involve configuring settings of the video switcher for a next transition in a manner that prepares the video switcher to transition the recalled resource state memory to the program output.

Such a method may be embodied, for example, in an article of manufacture in the form of a non-transitory computer-readable storage medium storing instructions which, when executed by a computer, cause the computer to perform the method.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

Figure 1:
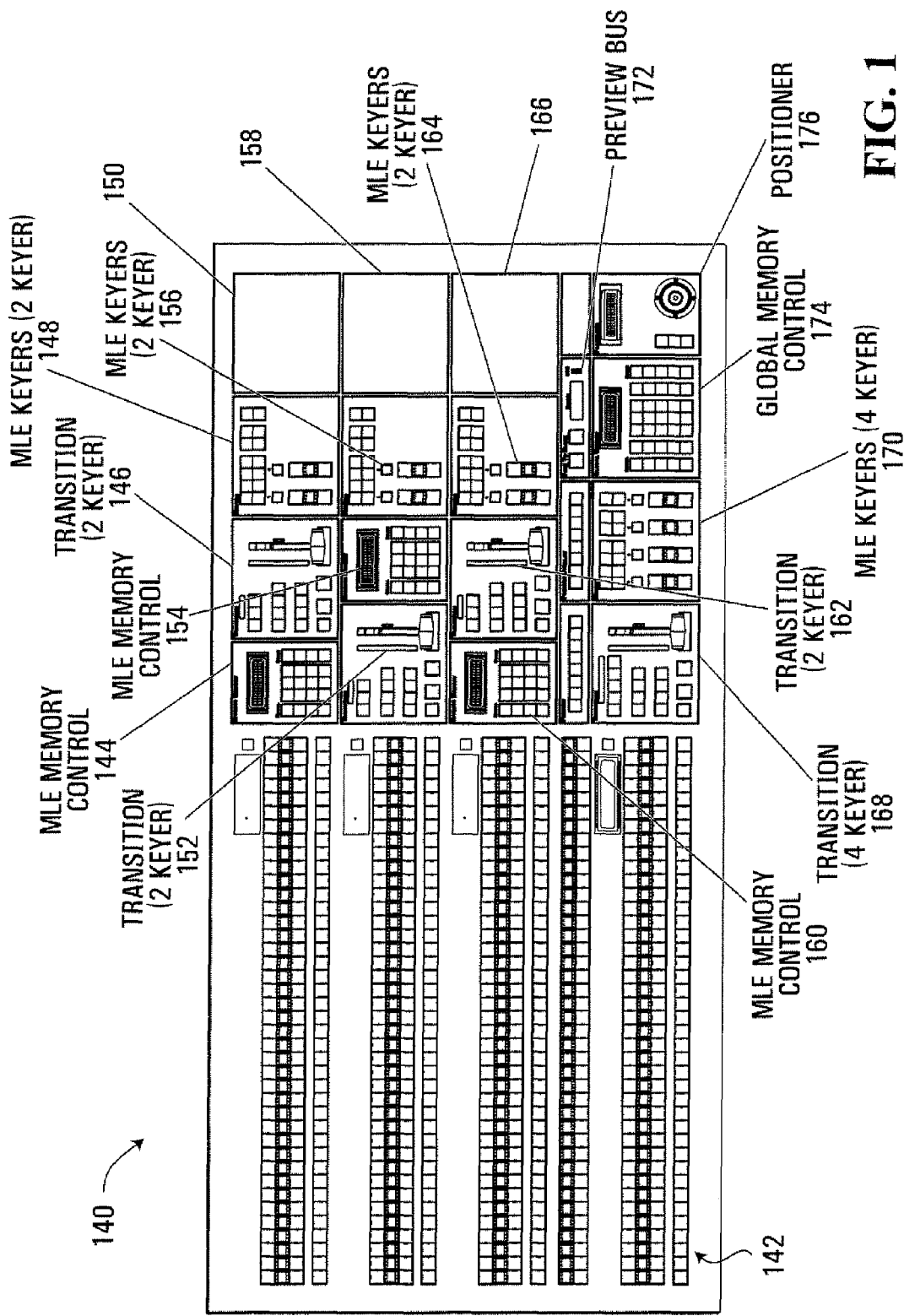
FIG. 1 is a top view of an example video production switcher panel.

Glossary of Terms
Aux Bus—A video output from a switcher, including either a single video source or a supplementary program output.

Background—A full-screen image which is placed as the bottom layer of an output video scene. All keys are placed on top of the background.

Clean Feed—A program output from a switcher in which one or more of the keys are not visible.

Effect—A visual or audio impression produced by combining or manipulating one or more video or audio signals.

GPI—General Purpose Interface. An electrical interface which triggers an event by logic level transition.

Key—An effect produced by "cutting a hole" in the background image or video, then filling the hole with video or matte from another source. Key alpha video cuts the hole, key fill video fills the hole. The video signal used for cut and fill can come from the same, or separate, sources.

Keyer—A circuit or processing element which performs the operation of placing a key over a background image and optionally over other keys.

Keyframe—A memory within a Timeline.

Layering—The process of combining a background with one or more keys. Each video element (background or key) is referred to as a layer, as each key added to the scene is added on top of, below, or in between the previous combination of background and keys.

Matte—A video signal consisting of one solid color throughout the entire image.

Memory—A snapshot of states such as settings of all controllable elements within a switcher or a defined subset of controllable elements within a switcher.

MLE—Multi-Level Effects.

Multi-Level Effects—A group of processing elements within a switcher that work together to produce one or more video outputs. An MLE may produce at least one program video output, but may also generate additional video outputs, such as additional programs, one or more previews, one or more clean feeds, and so on. An MLE includes several crosspoint buses, one or more keyers, and may also contain chroma keyers, wipe generators, DVEs, color correctors, and/or other processing units, for example.

M/E—Mix Effects. Synonymous with MLE.

Preset Bus—A crosspoint bus that selects the background for the preview output.

Preview Output—A scene generated by the switcher, and provided on a video output, which represents how the program will appear after the next transition is performed on the switcher.

Preview—The act of preparing a scene on the preview output of the switcher in anticipation of transitioning this scene to program.

Program—A scene which is the on-air output of the switcher. A switcher may have multiple program outputs, originating from different MLEs, auxiliary buses and/or other outputs.

Resource—A functional element within a switcher that performs some manner of video or audio processing to create a visual or audible effect. Resources may be configured with a state to determine their behaviour. Resources may be cascaded into other resources to produce a scene.

Scene—A video background, optionally with one or more keys layered, optionally using one or more video effects.

State—A setting or configuration applied to a resource.

Transition—A controlled change from one scene to another scene. The change can occur, for example, through a wipe, cut, dissolve or "DVE Send" effect.

Switchers

Switchers, such as video production switchers and master control switchers, are devices which allow several video signals to be combined together, and several audio signals to be combined together, in a variety of manners to assemble at least one program video and audio output. Often, different types of audio and video effects are used when these signals are assembled. For example, one video source may fade, or "dissolve" to another; one video source may be "wiped" to another, or one audio stream may fade out as another fades in. A switcher may also generate additional video and audio outputs such as preview, clean feed, aux buses, and so on. Each of these outputs may also include multiple video and audio sources assembled together with various audio-visual effects.

More advanced processing elements such as DVEs, which allow images to be resized, repositioned, rotated or manipulated in other advanced manners, may also be provided in a switcher. Switchers may also incorporate elements such as color correction, graphic management, chroma keying, motion effect processing, audio processing and so on.

A common paradigm in Switcher design is to combine groups of processing elements together into what is known as a "Multi-Level Effects" system (also known as "MLE") or a "Mix Effects" system (also known as "M/E"). An MLE could, for example, include a wipe generator, 4 keyers, 2 chrome keyers, 2 DVEs, 4 audio correctors and 6 color correctors. Different switchers provide different combinations of elements, and hence allow for different types of processing to be combined when assembling one or more video outputs. An MLE may additionally generate one or more audio outputs.

Switchers also provide the capability to switch or route video and/or audio sources into each of the incorporated processing elements, and often allow elements to be cascaded to generate more complicated effects. Furthermore, a switcher may allow an output from one MLE to be cascaded into another MLE. These switching and cascading operations are often referred to as "video routing" or "video switching" in the case of video signals. For example, a user may wish to generate an effect where a background video signal is fed into a color corrector, whose output is then cascaded into key 1, wherein a second video signal is layered onto the first. The output of key 1 may then be further cascaded into a DVE to perform a "page roll" transition, and the DVE output is subsequently layered on top of a "preset bus" video stream. All of these cascading operations can be performed by video routing elements, which may include hardware and/or components executing software, within the switcher.

A switcher may similarly provide the capability to switch or route audio sources into incorporated processing elements. Audio may be routed independently from the video, or be embedded within a video stream. Switchers also often allow elements to be cascaded to generate more complicated audio effects. For example, an audio stream may be fed through a stereo correction element, whose output is fed into an audio mixing element wherein a second audio stream is mixed with the first. The output of this mixing element could subsequently be cascaded into an audio mux element, wherein it is embedded into a video stream. All of these cascading operations can be performed by audio routing elements, which may include hardware and/or components executing software, within the switcher.

A user will typically use a control panel to configure the various processing elements, video routing and audio routing within the switcher. For large implementations, this generally involves a very large control panel with a large number of buttons, knobs, faders, joysticks, trackballs, menu systems and so on.

FIG. 1 is a top view of an example video production switcher panel. The switcher panel 140 in FIG. 1 includes various modules, such as crosspoint button modules generally designated 142, MLE memory control modules 144, 154, 160, two-keyer transition modules 146, 152, 162, two-keyer MLE keyer modules 148, 156, 164, a four-keyer transition module 168, a four-keyer MLE keyer module 170, a preview bus module 172, a global memory module 174, and a positioner module 176. Blanks which may be removed to accommodate additional modules are designated 150, 158, 166. Other embodiments may include further, fewer, or different modules arranged in a similar or different manner than shown.

Memories

As noted above, an effects memory is a snapshot of the state of all or a subset of the resources within a switcher. This is distinct from a storage device (for example, Random Access Memory (RAM) or a hard disk) in which memories may be stored. Although a storage device is often referred to as a memory, a memory in the context of the present application refers to the state of the resources within a switcher or a defined subset of resources of the switcher, and not a physical device in which such a memory may be stored. The states of resources in a memory in the context of the present application might indicate explicit states and/or changes in state. A change in state, for example, might reflect an event which is part of a macro.

By utilizing memories, a user may set up and store desired effects (MLEs, keyers, color correctors, etc), video routing, audio routing, and any other settings offered by the switcher. A memory may contain settings for any or all states for each resource within the switcher, such as chroma keyer settings, pattern wipe settings, audio correction settings, keyer settings and so forth. The memory may also store the on-air state of each element. For example, a memory may have information that key 1 and key 3 are on air, while key 2 and key 4 are off air.

The user may create many such memories, each defining a different setup of the switcher, generating different desired outputs from the switcher. A switcher may have provision for several memories to be stored simultaneously. In the present application, "state" is intended to capture the general notion of settings or setup of a switcher resource. Switcher resources may include any or all of video processing elements (e.g., keyers, MLEs, etc.), audio processing elements, video routing elements, and audio routing elements, for example.

A memory, when recalled, usually will modify at least one MLE within the switcher. That is, when the memory is recalled, one or more MLEs will have their settings replaced, in entirety, by the settings contained within the memory, Some implementations do provide "memory attributes" which allow a user to specify more finely which subsets of an MLE may be recalled. For example, a user may set an attribute to only recall "key 1" and "key 2", but not "key 3", "key 4" or "wipe generator" settings. Other attribute settings may allow the user to recall "keys only", so only keyers are recalled, but not wipe generators, video routing selections, and so on.

Some switchers implement a function called "recall to preview". This functionality filters the recalled memory, such that only stored states for resources that are currently not on-air are recalled. This allows switcher memories to be recalled to a subset of the switcher, without disturbing the current on-air image.

Timelines

More complex effects may be generated by creating more than one memory, and recalling them in sequence over time, where the state of a resource or plurality of resources may be interpolated between subsequent memories. This allows dynamic, moving effects to be generated in the switcher. This sequential sequence of memories is also known as a "timeline" or "sequence". Each memory within a timeline is also known as a "keyframe". Timelines may be used to recreate dynamic effects over the entire switcher or a defined subset of the switcher.

Macros

An additional method for the generation of memorized effects on a switcher is through use of a macro. A switcher may allow a sequence of events (button presses, knob adjustments, menu activations, and so on) to be recorded in order. A macro may be played back at a later time to repeat the sequence of events that was previously recorded. This differs from memories and timelines in that memories and timelines remember states of the switcher (or subsets of the switcher), and a timeline allows smooth transitions from state to state within the timeline. Macros remember activities or events.

It is possible for a user to combine memories, timelines and macros together to create certain desired effects on the switcher. For example, a macro may record an event which is a memory or timeline recall.

Resource Mapping

According to an aspect of the invention, when a memory is recalled, available resources are evaluated. The resources might include keyers which are off-air, DVE channels not in use, pattern generators not in use, and so on. The memory being recalled is then evaluated to determine which resources are actually required in the recalled memory. States in the recalled memory are then mapped into the available resources, rather than into those resources in which they were originally defined when the memory was stored. If the states of recalled resources have a layering priority, the layering order of the resources that are actually utilized for those states will be adjusted, by Resource Mapping logic for instance, to match the layering order of the states of the resources as defined in the stored memory.

This resource mapping may occur at different levels of granularity. For example, one implementation may provide resource mapping at the MLE level (where an effect is recalled in entirety to an available MLE), whereas other implementations may perform resource mapping at a finer resource level (keyers, wipe generators, crosspoints, and so on).

Intelligent Recall to Preview

Some embodiments of the present invention allow a user to preview a recalled memory and transition it cleanly to air. Available resources in the switcher are analyzed and states in a recalled macro, memory, or timeline are dynamically assigned to the available off-air resources. This adapts to the resources that are available on the switcher at the time a memory is recalled. Furthermore, the states can be recalled to resources in an off-air state, so as to preset the system to provide a simple operation to transition the desired effect to an on-air state. In this embodiment, the on-air (or program) audio and video effect, as defined in the recalled memory, is presented on a preview output, and the transition controls in the switcher could be preset to allow the next transition to transition cleanly to the desired effect. The type of transition may be defined in the recalled memory, a system default or overridden by a user control and so forth. This transition may be triggered in any of a number of different ways including, for example, a button press, a fader handle, remote GPI, remote automation and so forth. This allows "back-to-back" effects to be recalled and transitioned-to cleanly, even on a 1 MLE switcher.

These features can be of significant benefit to a user in that they may design a desired effect or program output and store this to a memory, without needing to anticipate which resources may be available at the time at which the memory will be recalled. Thus, the user is not required to reconfigure the transition controls to bring the recalled effect to an on-air state.

Macros

Another embodiment of the invention allows events and effects memories associated with events within a macro to be analyzed and applied to available resources on a switcher through the resource mapping and intelligent recall to preview embodiments. Furthermore, a macro execution may receive feedback from resource mapping logic to adapt event execution and memory recall to the remapped resources where appropriate.

For example, if at the time of execution of a macro the resource mapping logic remaps the key 2 resource to key 1, all stored macro events that have actions that modify states on the key 2 resource will be redirected to the key 1 resource, providing the user with the desired effect.

Timelines

A timeline may also be recalled using the resource mapping and intelligent recall to preview embodiments. However, in this embodiment, the system additionally re-allocates the resources at each keyframe as required to produce the intended effects. As additional resources are introduced in the execution of the timeline (for example, a timeline may use 2 keyers for the first keyframe, and introduce the use of a 3rd keyer in a subsequent keyframe), the state each of the newly introduced elements is assigned to a resource of the available resources. Timeline execution logic may receive feedback from the resource mapping logic to adapt timeline execution and keyframe state recall to the remapped resources where appropriate.

Configuration

A user may reserve certain resources or subsets of the switcher such that resource allocation logic will not allocate recalled elements to those resources. This benefits the user in that they may be guaranteed that the reserved resources are available at any time, regardless of which memories, timelines or macros may have been recalled. For example, the user may wish to reserve a downstream keyer for specific logo insertion purposes. The user would reserve the downstream keyer such that the resource allocation logic does not recall any elements to that keyer, thus ensuring it is available at any time for the user's purposes.

A user may also lock specific elements within the memory, timeline or macro to a specific resource in some embodiments, thus ensuring that the element will always be recalled to the same resource on the switcher. This benefits the user in that it provides consistency in the operation of the unit, if that element is often manually manipulated after the recall. It may also be desirable if there are certain controls or interactions with equipment external to the switcher, of which the switcher and resource allocation logic has no knowledge or control. By guaranteeing the resource to which the element is recalled, the external equipment or controls may be configured to interact with these specific switcher resources. For example, if a character generator operator has a remote switch to signal a keyer to bring a graphic on and off air, it could be advantageous to ensure that the graphics are always recalled to the keyer that the operator has control of.

The resource reservation and element locking controls discussed above may be either configured globally for an entire switcher, or applied to specific subsets of the switcher. These controls can also be applied as a memory attribute, thus allowing the user to specify particular memories with restrictions on where they must or may not recall certain elements.

Feedback

Since the resources to which elements are recalled could be modified, feedback regarding such modifications is provided to the user in some embodiments. One implementation provides a status display on a graphical user interface to indicate which elements were reallocated or remapped to different resources. This display might also or instead indicate whether any elements could not be recalled if, for example, there were insufficient resources or a conflict between locked elements and reserved resources.

This display might also allow feedback to be provided prior to the memory, macro, or timeline being recalled, such that the user may preview the system's ability to recall the memory, macro, or timeline. This can provide the user with an opportunity to adjust the current state of the system or adjust what is being recalled to meet the user's needs.

A further potential advantage of feedback, whether provided in a display or some other type of user interface device, is that the user could be allowed to override decisions, by resource mapping logic for instance, on which elements are assigned to which resources. The user can then manage the resource allocation manually. Any adjustments made by the user could then be applied as attributes in a memory, timeline, or macro to guide resource mapping on subsequent recalls.

Although one possible implementation of a feedback display is on a graphical user interface, other feedback methods, devices, indicators or controls may also or instead be employed. Feedback of the system's ability to recall and the results of mapping decisions may also or instead be communicated to a remote control device or automation system, thus allowing these systems to react appropriately, present useful information, and/or allow an operator to manage the resource allocation manually.

The resource mapping, and any manual modifications, along with any element locks and resource reservations are made available to a logging system in some embodiments. Logs could be useful, for example, for the user's information, or may be communicated to other equipment or systems to allow them to adjust to the reallocation of resources in the switcher.

Figure 2:
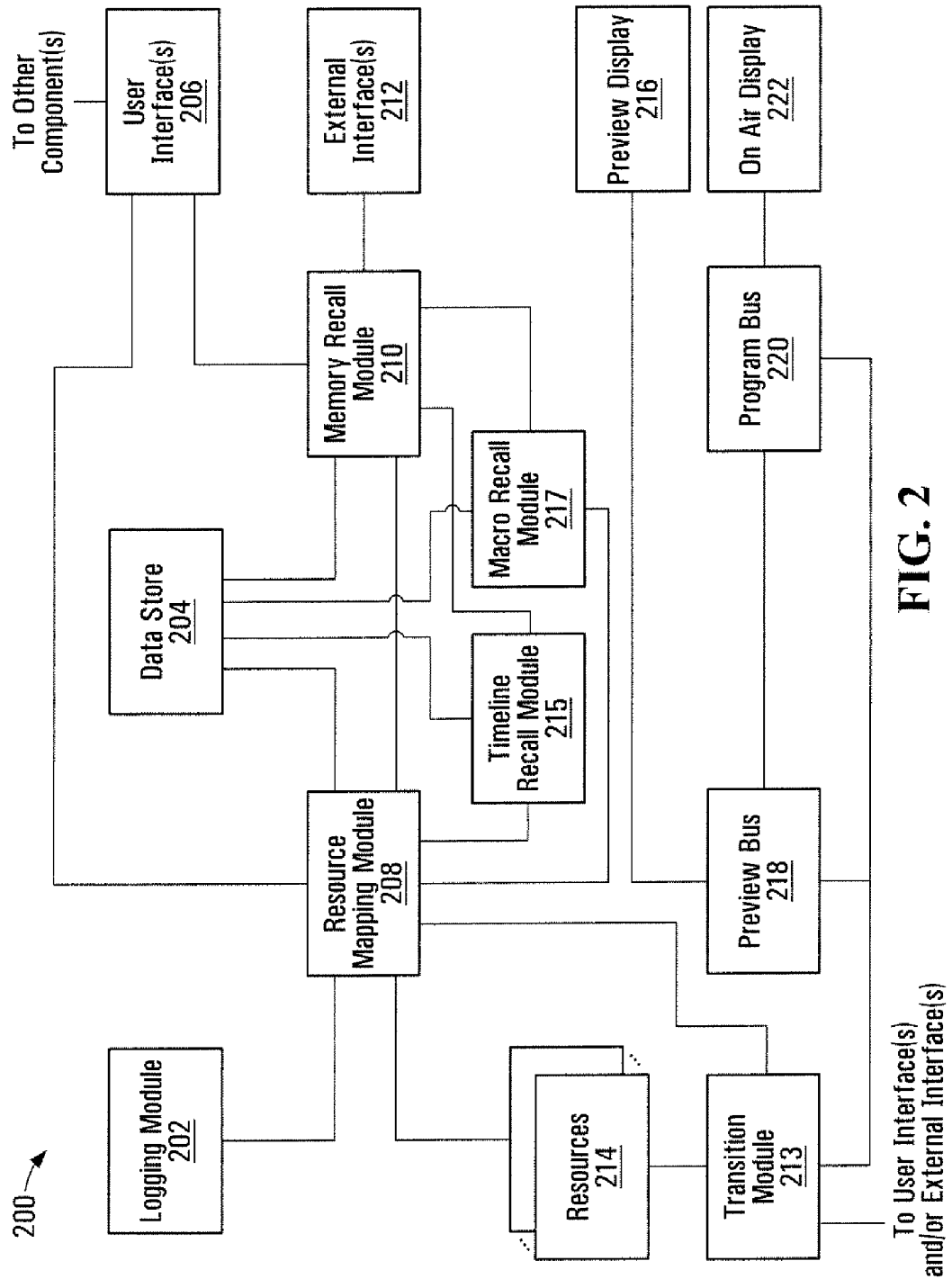
FIG. 2 is a block diagram of an apparatus.
Figure 3:
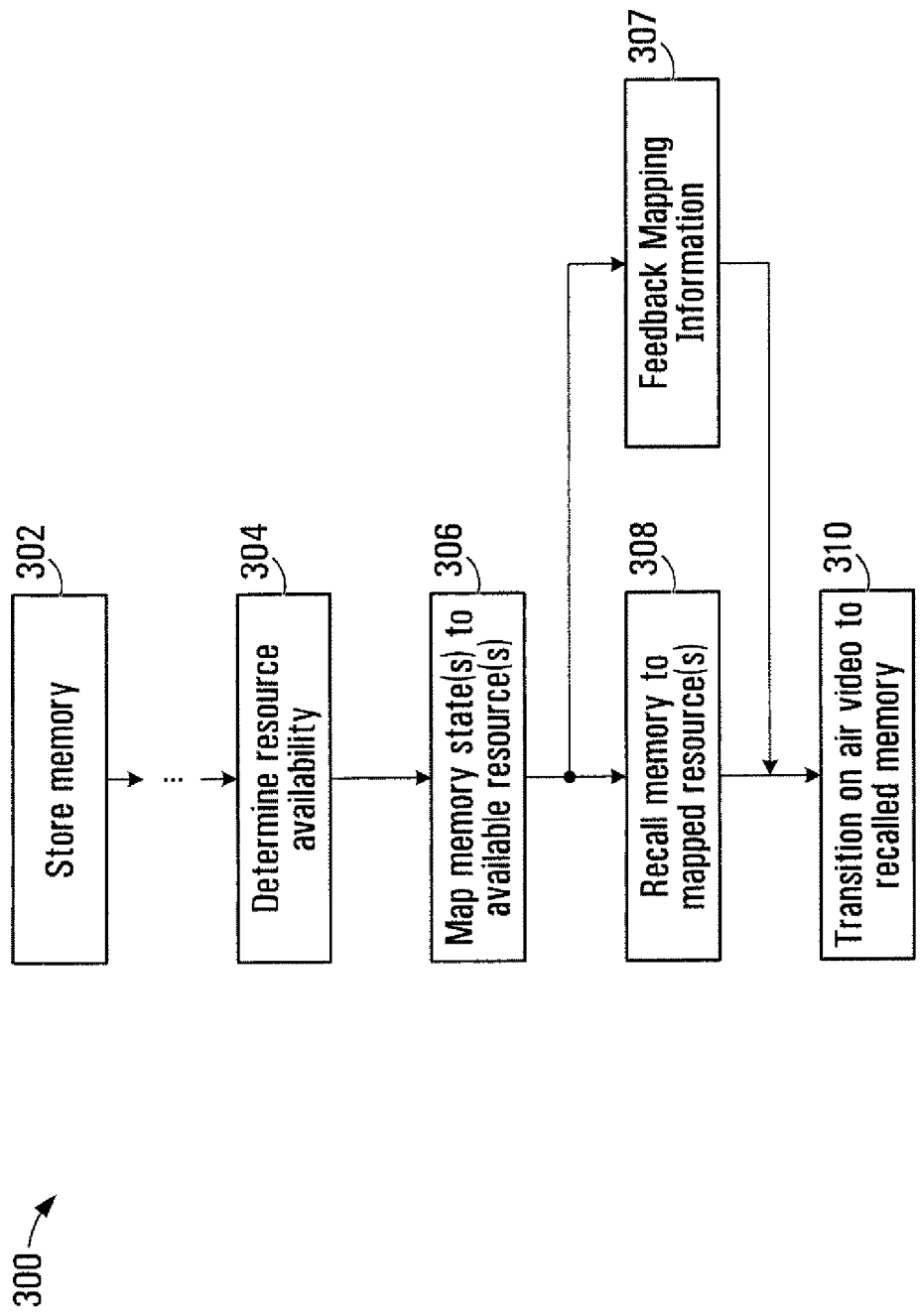
FIG. 3 is a flow diagram of a method.

Features associated with some aspects and embodiments of the invention have been described briefly above. Illustrative embodiments of the invention implementing such features are described in more detail below with reference to the drawings. FIG. 2 is a block diagram of an apparatus and FIG. 3 is a flow diagram of a method according to embodiments of the invention.

The example apparatus 200 in FIG. 2 includes a logging module 202, a data store 204, one or more user interfaces 206, a resource mapping module 208, a memory recall module 210, one or more external interface(s) 212, a transition module 213, a timeline recall module 215, a macro recall module 217, resources 214, a preview display 216, a preview bus 218, a program bus 220, and an on air display 222, which are interconnected as shown. It should be appreciated that the system of FIG. 2, as well as the contents of the other drawings, are intended solely for illustrative purposes, and that the present invention is in no way limited to the particular example embodiments explicitly shown in the drawings and described herein. Other embodiments may include further, fewer, and/or different components interconnected in a similar or different order. For example, although the apparatus 200 might support both resource mapping and intelligent recall to preview aspects of the invention, these aspects can potentially be implemented independently of each other. There may also be other interconnections between components, as indicated for the user interface(s) 206 for instance. Such interconnections may exist but have not been explicitly shown in FIG. 2 in order to avoid overly complicating the drawing.

Those skilled in the art will be familiar with various options for implementing at least some of the components shown in FIG. 2. Video switchers often incorporate some sort of storage device(s), such as a flash storage device and a hard drive, to provide a data store 204. More generally, the data store 204 may be implemented using one or more storage devices which use fixed, movable, or even removable storage media. User interface(s) 206, external interface(s) 212 for supporting interaction with external components such as a remote control or automation system, resources 214 such as video and/or audio processing elements, preview and program buses 218, 220, and preview and program displays 216, 222 are also common in video switchers. The user interface(s) 206, for example, might include one or more of buttons, knobs, joysticks, keyboards, keypads, a pointing device such as a mouse, a touchscreen, and/or a Graphical User Interface (GUI) presented on a display device. Various examples of resources 214 that may be provided in a video switcher have been described above.

The logging module 202, the resource mapping module 208, any or all of the recall modules 210, 215, 217, and the transition module 213 may be implemented, for example, in hardware, firmware, processing devices executing software, or combinations thereof. Microprocessors, Application Specific Integrated Circuits (ASICs), Field Programmable Gate Arrays (FPGAs), and Programmable Logic Devices (PLDs) are examples of processing devices that could be used to execute software. In light of their wide range of possible implementations, these components are described in detail below primarily in terms of their functions, which would enable a skilled person to implement embodiments of the invention in any of various ways.

The apparatus 200 shown in FIG. 2 contains a plurality of resources 214, including video and/or audio processing elements. In operation, the data store 204 stores at least a resource state memory representing a state of a resource. The memory may be created by a user by setting up the resource and creating the memory, using one of the memory control interfaces 144, 154, 160, 174 shown in FIG. 1, for example. The resource mapping module 208 determines availability of the resource when the resource state memory is to be recalled from the data store 204, determines availability of another resource of the plurality of resources where the resource is unavailable, and maps the state of the resource in the memory to the other resource where the resource is unavailable and the other resource is available. Determination of availability might involve the resource mapping module 208 interacting directly with the resources 214 or with the data store 204 or another data store which stores resource availability or status information, for instance.

One variation of this resource availability determination would involve the resource mapping module 208 determining availability of the resources when the resource state memory is to be recalled from the data store 204, and mapping the state of the resource in the memory to another resource where the resource is unavailable and the other resource is available.

Thus, in one possible implementation, the resource mapping module 208 determines availability of a resource on which a memory was created and determines availability of other resources only if the original resource is unavailable. According to the variation noted above, the resource mapping module 208 determines the availability of multiple resources before mapping a state from a recalled memory to a resource.

Regarding availability, the resource mapping module 208 might determine that a resource is unavailable where that resource is in use or on air, for example.

In some memories, there may be a layering priority associated with the state of the resource in the memory, and in this case the resource mapping module 208 sets a layering order of the other resource to match the layering order of the state of the resource in the memory where the state of the resource in the memory is mapped to the other resource.

A video switcher, in which or in conjunction with which the apparatus 200 is implemented, may include respective sets of different types of video and audio processing elements or resources 214. For example, multiple keyers and multiple MLEs might be provided. The data store 204 may then store resource state memories that represent states of resource of one or more of the different types of resources. The resource mapping module 208 can dynamically map states of resources in the memories for each type of resource of a set that includes multiple resources. In the example of multiple keyers and multiple MLEs, the resource mapping module 208 can dynamically map a keyer state in a memory to an available one of the keyers and an MLE state in a memory to an available one of the MLEs. Dynamic mapping of audio resource states to audio processing elements is also contemplated.

A further embodiment contemplates the ability for the resource mapping module 208 to sub-divide a state memory of a complex resource, such as an MLE for example, into a plurality of state memories for a plurality of simpler resources, in a fashion where the program output would match that of the original complex state memory as mapped onto a complex resource.

The memory recall module 210 implements an intelligent recall to preview function. Thus, the memory recall module 210 recalls a memory such that the state of a resource in the memory is recalled to an available resource, but that video or audio processing element remains off air. In one embodiment, this involves recalling the state in the memory to the preview bus 218 instead of to the program bus 220. A desired program output defined by the memory can thus be recreated on a preview output of the video switcher, whereby a current program output of the video switcher is undisturbed when the resource state memory is recalled. The transition module 213 could then be configured by the resource mapping module 208 to preset the next transition to bring the recalled state to the on air display 222 via the program bus 220.

In the case of a macro recalled by the macro recall module 217, the memory recall module 210 or the resource mapping module 208 could provide feedback to the macro recall module during execution of the macro by the resources 214, to adapt event execution to the available resource where the state of the resource in the memory is mapped to a different resource for recall. Feedback of the remapping performed by the resource mapping module 208 is provided to the macro recall module 217 such that it is able to perform its functions upon the states of the remapped resources in subsequent macro events. For example, if the resource mapping module 208 remaps a state for key 1, as defined by either a macro event or memory recall, into the key 2 resource, this remapping is fed back to the macro recall module 217, such that subsequent macro events that may effect key 1 are subsequently remapped to key 2. Macros could be stored in the same data store 204 as effects memories, or in a different data store.

Resource mapping may also be applied to a timeline, in which case the resource state memory in the data store 204 is one of a plurality of resource state memories representing keyframes of the timeline. The resource mapping module 208 maps states in the resource state memories to available video and/or audio processing resources of the video switcher for each keyframe. Feedback of the remapping performed by the resource mapping module 208 is provided to the timeline recall module 215 by the resource mapping module 208 itself or by the memory recall module 210. This allows the timeline recall module 215 to ensure that subsequent state memory keyframes are similarly remapped and interpolation of state memories for a remapped resource occurs within the same remapped resource. For example, if the resource mapping module 208 remaps a state within a keyframe for key 1 into the key 2 resource, this remapping is fed back to the timeline recall module 215, such that subsequent keyframes that may change the state of key 1 are subsequently remapped to key 2, allowing the state interpolation to be performed by the timeline recall module on key 2. Timelines could be stored in the data store 204 as in the example shown, or in a separate data store.

Feedback can similarly be provided to the transition module 213, by the resource mapping module 208 in the example shown.

One or more user interface(s) 206 may enable a user to reserve one or more resources such that the resource mapping module 208 will not map the state of the resource(s) in a memory to the reserved one or more resources, to lock a resource such that the state of the resource in the memory will always be recalled to that particular locked resource, and/or to override mapping of the state of a resource in a memory by the resource mapping module. Such user configurations as resource reservation and/or resource locking could be configurable globally, for application to specific subsets of the video switcher, and/or as a memory attribute specific to a resource state memory.

The user interface(s) 206 may also or instead include a user interface that enables feedback regarding recall of the resource state memory to be provided to the user. Such feedback could include, for example, one or more of: an indication that the state of the resource in the memory is mapped to another resource; an indication that the state of the resource could not be recalled; and an indication prior to recall of the resource state memory such that the user may preview the ability to recall the resource state memory.

A record of information regarding mapping of the state of resources in a memory may be useful for various purposes, and the logging module 202 provides such information. The logging module 202 could also or instead provide information regarding reserved resources, locked resources, and user override of resource mapping that is applied by the resource mapping module 208. Such information could be provided, for example, to a logging system (not shown) which is part of the video switcher or an external system.

The memory recall module 210 has been described briefly above in the context of recalling a mapped memory state. More generally, the recall module 210 recalls a resource state memory, which represents respective states of one or more resources of a video switcher to create a desired program output of the video switcher. According to an aspect of the invention, the memory is recalled to recreate the desired program output on a preview output of the video switcher, whereby a current program output of the video switcher is undisturbed when the resource state memory is recalled. In one embodiment, a transition control of the transition module 213 enables a user to control an on air transition from the current program output to the desired program output. The memory could be recalled to the preview bus 218 and displayed on the preview display 216, for example, and the transition control can be used to transition the recalled memory to the program bus 220 and the on air display 222. Examples of such a transition control include a button, a fader handle, an interface enabling remote GPI, and an interface enabling remote automation. These interfaces could be provided as one or more external interfaces 212.

In the case of a timeline, the resource state memory is one of a plurality of resource state memories representing keyframes, and the memory recall module 210 recalls the resource state memories to the video switcher for each keyframe. The timeline recall module 215 interacts with the memory recall module 210 to control recall of the keyframes in the correct sequence according to a recalled timeline.

In the case of a macro, the memory recall module 210 recalls the resource state memories to the video switcher as part of a macro event. The macro recall module 217, like the timeline recall module 215, interacts with the memory recall module 210 to control recall of a memory that is part of a macro event.

Other variations may be or become apparent to those skilled in the art.

Aspects of the present invention may also or instead be embodied in methods. FIG. 3 is a flow diagram of one such method. The method 300 involves storing a resource state memory at 302. The memory represents a state of a resource, illustratively a video or audio processing element, of a video switcher. In some embodiments, the video switcher has a plurality of the resources.

Availability of the resource is determined at 304 when the resource state memory is subsequently to be recalled. If the video switcher includes more than one resource of the type for which the memory was created, availability of all of those resources could be determined at 304. At 306, the state of the resource in the memory is mapped to an available resource which might be the same resource that was used to create the stored memory or another resource where the original resource is unavailable and the other resource is available at the time of recall.

At 307, the mapping of resources is fed back, to the Memory Recall Module 210, the User Interface(s) 206, the timeline recall module 215, the transition module 213, and/or the macro recall module 217 (FIG. 2).

The memory is recalled to the mapped resource at 308, but might not necessarily be brought to air at 310 until a transition control is operated by a user or a next transition is automatically configured. According to the intelligent recall to preview aspect of the present invention, a memory is recalled to a video switcher to recreate a desired program output on a preview output of the video switcher, such that a current program output of the video switcher is undisturbed when the resource state memory is recalled.

The method 300 is intended solely for illustrative purposes, and other embodiments may involve variations of this method. For example, the operations shown in FIG. 3 could be repeated for multiple states and/or resources in a memory, and macro and/or timeline processing is also contemplated. In addition, since the intelligent recall to preview aspect of the present invention could be implemented independently of the resource mapping feature, the operations at 308 and 310 need not necessarily be preceded by resource mapping, and feedback at 307 also would not be performed where there is no resource remapping. Further variations may be or become apparent to those skilled in the art, on the basis of the foregoing apparatus description for instance. Thus, any or all of the functions described herein in the context of an apparatus may similarly be embodied in a method.

What has been described is merely illustrative of the application of principles of embodiments of the invention. Other arrangements and methods can be implemented by those skilled in the art without departing from the scope of the present invention.

For example, although described primarily in the context of apparatus and methods, other implementations of the invention are also contemplated, including an article of manufacture in the form of a non-transitory computer-readable storage medium storing instructions for execution by a computer for instance.

We claim:

1. An apparatus comprising:
   a data store for storing a resource state memory representing a state of a resource of a video switcher, the video switcher comprising a plurality of the resources, the state comprising a setting or configuration applied to the resource; and
   a resource mapping module that determines availability of the resource when the resource state memory is to be recalled from the data store, and dynamically remaps the state of the resource in the memory to another resource of the plurality of resources when the resource is unavailable and the other resource is available.

2. The apparatus of claim 1, wherein the resource mapping module determines availability of the plurality of resources when the resource state memory is to be recalled from the data store.

3. The apparatus of claim 1, wherein the resource mapping module determines that the resource is unavailable when the resource is in use or on air.

4. The apparatus of claim 1, wherein the resource mapping module further determines a layering priority associated with the state of the resource in the memory, and sets a layering order of the other resource to match the layering order of the state of the resource in the memory when the state of the resource in the memory is remapped to the other resource.

5. The apparatus of claim 1, wherein the plurality of resources comprises MLEs, keyers, wipe generators, crosspoints, or other types of video and/or audio processing elements.

6. The apparatus of claim 1, wherein the video switcher comprises respective sets of different types of resources, wherein the data store is for storing resource state memories each representing states of resources of one or more of the different types of resources, and wherein the resource mapping module dynamically remaps states of resources in the memories for each type of resource of a set comprising multiple resources.

7. The apparatus of claim 1, further comprising:
   a memory recall module, operatively coupled to the data store and to the resource mapping module, that recalls the resource state memory such that the state of the resource in the memory is recalled to an available one of the plurality of resources, and the available one of the plurality of resources remains off air.

8. The apparatus of claim 7, wherein the state of the resource in the memory is associated with a desired program output of the video switcher, and wherein the memory recall module recalls the resource state memory to recreate the desired program output on a preview output of the video switcher, whereby a current program output of the video switcher is undisturbed when the resource state memory is recalled.

9. The apparatus of claim 8, further comprising:
   a transition module, operatively coupled to the program output of the video switcher, that configures settings of the video switcher for a next transition in a manner that prepares the video switcher to transition the recalled resource state memory to the program output.

10. The apparatus of claim 1, further comprising:
a memory recall module, operatively coupled to the data store and to the resource mapping module, that recalls the resource state memory; and
a macro recall module, operatively coupled to the resource mapping module and to the memory recall module, that recalls a macro,
wherein the resource mapping module or the memory recall module provides feedback to the macro recall module during execution of the macro to adapt execution of events in the macro, which are associated with the resource, to the other resource when the state of the resource in the memory is remapped to the other resource.

11. The apparatus of claim 1, wherein the resource state memory comprises one of a plurality of resource state memories representing keyframes of a timeline, and wherein the resource mapping module remaps states in the memories to available resources of the video switcher for each keyframe.

12. The apparatus of claim 11, further comprising:
a memory recall module, operatively coupled to the data store and to the resource mapping module, that recalls the plurality of resource state memories; and
a timeline recall module, operatively coupled to the resource mapping module and to the memory recall module, that recalls the timeline,
wherein the resource mapping module or the memory recall module provides feedback to the timeline recall module to adapt execution of events and recall of subsequent keyframes in the timeline, which are associated with particular resources, to the available resources.

13. The apparatus of claim 11, wherein reservation of the one or more resources and/or locking of the resource are configurable globally, for application to specific subsets of the video switcher, and/or as a memory attribute specific to the resource state memory.

14. The apparatus of claim 1, further comprising:
a user interface that enables a user to:
reserve one or more resources of the plurality of resources, the one or more reserved resources being unavailable for remapping by the resource mapping module,
lock the resource such that the state of the resource in the memory is recalled only to the resource, and/or
override remapping of the state of the resource in the memory by the resource mapping module.

15. The apparatus of claim 14, further comprising:
a logging module that provides information regarding any or all of: mapping of the state of the resource in the memory, the one or more reserved resources, locking of the resource, and user override of remapping of the state of the resource in the memory by the resource mapping module.

16. The apparatus of claim 1, further comprising:
an external interface that enables feedback regarding ability of the video switcher to recall the resource state memory and results of remapping decisions to be provided to one or more of: a remote control system and an automation system.

17. The apparatus of claim 1, further comprising:
a user interface that enables feedback regarding recall of the resource state memory to be provided to a user, wherein the feedback comprises one or more of:
an indication that the state of the resource in the memory is remapped to the other resource;
an indication that the state of the resource could not be recalled; and
an indication, prior to recall of the resource state memory, of the ability to recall the resource state memory.

18. The apparatus of claim 1, further comprising:
a logging module that provides information regarding the dynamic remapping of the state of the resource in the memory to the other resource.

19. The apparatus of claim 1, wherein the video switcher is a video production switcher, a master control switcher, or stand-alone keyer.

20. The apparatus of claim 1, wherein the resource mapping module sub-divides the resource state memory into a plurality of resource state memories for multiple resources.

21. The apparatus of claim 1, wherein the state of the resource in the memory is associated with a desired program output of the video switcher, the apparatus further comprising:
a memory recall module that recalls the resource state memory to the video switcher to recreate the desired program output on a preview output of the video switcher, whereby a current program output of the video switcher is undisturbed when the resource state memory is recalled.

22. The apparatus of claim 21, wherein the video switcher comprises a transition control that enables a user to control an on air transition from the current program output to the desired program output.

23. The apparatus of claim 22, wherein the transition control comprises one or more of: a button, a fader handle, an interface enabling remote GPI, and an interface enabling remote automation.

24. The apparatus of claim 21, wherein the resource state memory comprises one of a plurality of resource state memories representing keyframes of a timeline, and wherein the memory recall module recalls the memories to the video switcher for each keyframe.

25. The apparatus of claim 21, further comprising:
a transition module, operatively coupled to the program output of the video switcher, that configures settings of the video switcher for a next transition in a manner that prepares the video switcher to transition the recalled resource state memory to the program output.

26. A method comprising:
storing a resource state memory representing a state of a resource of a video switcher, the video switcher comprising a plurality of the resources, the state comprising a setting or configuration applied to the resource;
determining availability of the resource when the resource state memory is to be recalled; and
dynamically remapping the state of the resource in the memory to another resource of the plurality of resources when the resource is unavailable and the other resource is available.

27. The method of claim 26, further comprising:
determining availability of the plurality of resources when the resource state memory is to be recalled.

28. The method of claim 26, wherein the resource state memory comprises one of a plurality of resource state memories representing keyframes of a timeline, and wherein dynamically remapping comprises dynamically remapping states in the memories to available resources of the video switcher for each keyframe.

29. The method of claim 28, further comprising:
providing feedback to adapt execution of events and recall of subsequent keyframes in the timeline, which are associated with particular resources, to the available resources.

30. The method of claim 26, further comprising:
providing a user interface that enables a user to:
reserve one or more resources of the plurality of resources, the one or more reserved resources being unavailable for remapping,
lock the resource such that the state of the resource in the memory is recalled only to the resource, and/or
override remapping of the state of the resource in the memory.

31. The method of claim 26, further comprising:
providing feedback regarding recall of the resource state memory to a user,
wherein the feedback comprises one or more of:
an indication that the state of the resource in the memory is dynamically remapped to the other resource;
an indication that the state of the resource could not be recalled; and
an indication, prior to recall of the resource state memory, of the ability to recall the resource state memory.

32. A non-transitory computer-readable storage medium storing instructions which, when executed by a computer, cause the computer to perform the method of claim 26.

33. The method of claim 26, wherein the state of the resource in the memory is associated with a desired program output of the video switcher, the method further comprising:
recalling the resource state memory to the video switcher to recreate the desired program output on a preview output of the video switcher, whereby a current program output of the video switcher is undisturbed when the resource state memory is recalled.

34. The method of claim 33, further comprising:
configuring settings of the video switcher for a next transition in a manner that prepares the video switcher to transition the recalled resource state memory to the program output.

35. A non-transitory computer-readable storage medium storing instructions which, when executed by a computer, cause the computer to perform the method of claim 33.

* * * * *